(12) United States Patent
Cohen

(10) Patent No.: US 6,611,253 B1
(45) Date of Patent: Aug. 26, 2003

(54) VIRTUAL INPUT ENVIRONMENT

(76) Inventor: Harel Cohen, 22 Shderot Levi Eshkol, Jerusalem 97764 (IL)

( * ) Notice: Subject to any disclaimer, the term of this patent is extended or adjusted under 35 U.S.C. 154(b) by 267 days.

(21) Appl. No.: 09/664,753

(22) Filed: Sep. 19, 2000

(51) Int. Cl.[7] .................................................. G09G 5/00
(52) U.S. Cl. ...................................... 345/168; 345/173
(58) Field of Search ................................ 345/156, 157, 345/168, 169, 173, 7, 8, 9, 158; 341/20, 22; 382/107, 108

(56) References Cited

U.S. PATENT DOCUMENTS

| | | | | |
|---|---|---|---|---|
| 4,988,981 A | * | 1/1991 | Zimmerman et al. | ........ 345/157 |
| 5,767,842 A | * | 6/1998 | Korth | .......................... 345/168 |
| 5,880,712 A | * | 3/1999 | Godman | ..................... 345/168 |
| 6,037,882 A | * | 3/2000 | Levy | ........................... 345/168 |
| 6,064,354 A | * | 5/2000 | DeLuca | ........................... 345/7 |
| 6,266,048 B1 | * | 7/2001 | Carau, Sr. | .................... 345/168 |
| 6,512,838 B1 | * | 1/2003 | Rafii et al. | ................... 382/106 |

* cited by examiner

Primary Examiner—Xiao Wu
(74) Attorney, Agent, or Firm—Mark M. Friedman

(57) ABSTRACT

The invention presents a method and a system for virtual input environment, and the creation of an input unit with a changeable keys display on an electronic device. The method enables generating a virtual representation through real-time simulation of a user's hands and of an input device (e.g. a keyboard), defining the position and the movements of the hands over the real input device, and displaying a virtual representation of the input device and of the user's hands in virtual space on an output device. The method further allows creating changeable keys on the input device, and assigning functions to the keys from various sources. The system includes virtual reality enabling hardware and software, and a virtual input device in which key displays are fully changeable. The method and system of the present invention enable natural typing action while seeing both hands and input device on a screen in front of the user.

18 Claims, 11 Drawing Sheets

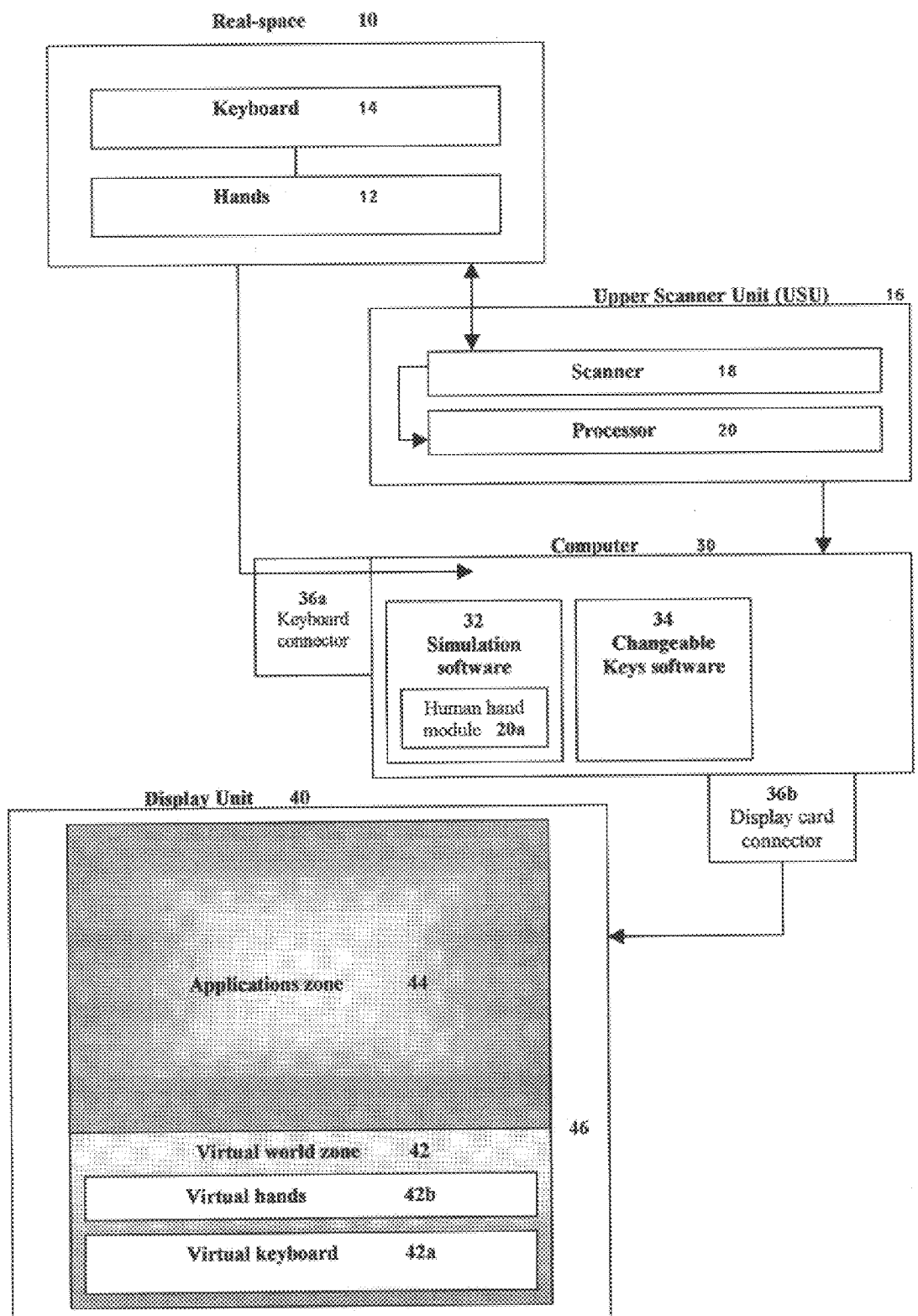

VIRTUAL INPUT ENVIRONMENT

FIELD AND BACKGROUND OF THE INVENTION

The inputting of information into electronic systems such as personal computers (PCs), mobile phones, palm computers, aircraft computers, etc., using input devices with keys, for example keyboards, touch pads or touch screens, all henceforth referred to as "keyboards", has not changed significantly since the invention of the PC. Most of the information or data is typed using a keyboard with fixed key functions. Particularly with PCs, dual language keyboards normally have a second language alphabet symbols etched into the keyboard keys together with the English alphabet, with the switching between the dual language functions of each key achieved generally by software instructions. In a standard keyboard, a user usually views up to three symbols imposed on each key, defining different languages and options provided by different software and system operation methods. The mouse also serves independently for graphic command inputs.

Standard keyboards suffer from a number of disadvantages and limitations. They normally contain function keys, for example with symbols F1 to F12, which hide functions defined in separate instructions. The user has to learn and memorize these hidden functions, or constantly invoke their meaning from a look-up table, a "Help" directory or other sources. Such keyboards are limited in the number of keys, and therefore key functions. A non-professional typist normally has to follow the typing action by shifting frequently his gaze between the keyboard placed on a desk and the PC monitor screen, which is normally placed in front and higher on the desk. In particular with dual-language keyboards, this frequent eye shifting, and the frequent non-feedback use of the "Alt+Shift" and "Caps Lock" functions, leads to errors in typing. With the advent of wide Internet usage, PC users are required to use the standard keyboard for more and more complicated input commands, or for remembering more "hidden" functions of each key.

Advanced keyboards with changeable key functions, and in particular keyboards using keyboard emulation, virtual keyboards, and other techniques to overcome some of the limitations mentioned above, have been proposed in the past. For example, U.S. Pat. Nos. 4,431,988, 4,551,717, 4,633,227, 4,647,911, and 5,164,723 propose keyboards with changeable key displays or definable keys, mostly implemented in the hardware keyboard itself. However, none of these patents or other prior art changeable or configurable keyboards provide a keyboard which has fully selectable, configurable and changeable keys imposed on the virtual representation of a keyboard, with the changeable key functions provided by various sources, as does the present invention. U.S. Pat. No. 5,164,723 for example, reviews prior art technologies regarding hardware keyboards with changeable key displays, and describes a changeable keys keyboard which has a plurality of key operated switches, each including a key having a manually engageable key surface. The display on the key is changed by means such as optical fibers or LCDs, in some cases automatically according to the present function of a key. This is a "hardware" implementation of a changeable keyboard, which makes the keyboard cumbersome and expensive. The keys can be changed by user instructions only, not by software instructions from other sources such as applications software and Internet sites, as provided by a main feature of the present invention.

A recent U.S. Pat. No. 6,037,882, discloses a method and apparatus for inputting data to an electronic system using virtual reality techniques. Virtual reality is used primarily in some electronic and computer games. Virtual reality simulation is usually achieved by the use of wearable computing technology, typically sophisticated computers having communication ability to the bodies of the users. The output from a wearable computer is normally viewed on a display, which may be worn over the eye of a user. The main objective of U.S. Pat. No. 6,037,882 is to allow switching between two modes of an input device such as a keyboard, without having the user look at the real device, and instead having him look at a virtual representation of the device. The method of U.S. Pat. No. 6,037,882 includes the steps for generating a representation of an input device, having a plurality of input options in virtual space, sensing the position of a user in real-space, using a surface sensor, and displaying the representation of the input device and the position of the user in virtual space on a head-mounted display. However, in contrast with the present invention, this patent employs a fixed configuration, standard keyboard that cannot be assigned changeable keys, i.e. other functions, and therefore lacks the versatility that is one of the central features of the present invention. Sensors are incorporated in the keyboard itself, making it expensive. There is a very basic simulation of the hands, but no full simulation of both hands and keyboard, and the input (keying) action is not a natural action of typing, as in the present invention. The preferred input action in U.S. Pat. No. 6,037,882 is an "unnatural" (to a typist) action, in which a cursor-like finger presses one key, when the input action itself is governed by a dedicated microprocessor. Therefore, U.S. Pat. No. 6,037,882 lacks a few of the basic advantages of the present invention, for example the advantage that the present invention enables a natural typing action as commonly practiced, using all ten life-like fingers of two hands simulated in real-time together with the keyboard on a display.

U.S. Pat. No. 6,088,018 describes the use of a video camera or sensor to image all or parts of a user's body on a display, in order to have an interactive data input action in the display. The user image is a video image, not a virtual one, and there is no specific mention of an external input device. The essence of the method is a new way of inputting data "in the display", not of simulating a virtual reality image of a well established input device such as a keyboard, which then can be viewed, assigned any desired function to any of its keys, and activated in a natural way by natural typing action when the user sees his hands on the same display. The method of U.S. Pat. No. 6,088,018 does not view a keyboard as an important element, does not provide therefore the changeable keys and function assignment features as does the present invention, and requires the development of new, expensive, and complicated devices.

There is thus a widely recognized need for, and it would be highly advantageous to have, a method and system for inputting data into an electronic system using a keyboard with changeable keys, which a user can activate by natural typing movements. Specifically, there is a need for, and would be advantageous to have a method and system to simulate in real-time and view a virtual keyboard on a screen or display, to assign any key or function to the virtual keyboard, to simulate in real-time and view the hands of a user positioned over the virtual keyboard, and to use the virtual keyboard as if it is a real keyboard. The method and system of the present invention allow a real hardware keyboard which is scanned in order to obtain the simulation to be blank, simple, cheap and universal, with the assignation of key functions to virtual keys of the virtual keyboard implemented via software instructions and available from various sources, particularly applications software and Internet sites.

SUMMARY OF THE INVENTION

According to the present invention, there is provided a method for inputting data into an electronic system, comprising the steps of: providing a keyboard connected to the system, forming a virtual image of the keyboard on a display of the electronic system, the virtual image functioning as a virtual keyboard, assigning at least one symbol to at least one key of the virtual keyboard, forming a virtual image of at least one hand in spatial relationship to the virtual keyboard, the virtual image functioning coordinately with a hand of a user of the system such that it functions as a virtual hand of the user, and inputting data via the keyboard with the at least one hand.

According to one feature in the method of the present invention, the steps of forming a virtual image at least one hand and of the keyboard comprise the sub-steps of scanning the at least one hand and the keyboard, transmitting the information obtained from the scanning to the electronic system, and simulating in real-time the at least one virtual hand and the virtual keyboard.

According to another feature in the method of the present invention, the step of inputting further includes the sub-step of positioning the at least one virtual hand over the virtual keyboard, and influencing the at least one key to generate an input signal into the system.

According to yet another feature in the method of the present invention, the step of simulating further comprises running a calibration procedure for the at least one virtual hand and the virtual keyboard.

According to yet another feature in the method of the present invention, the step of scanning is performed by at least one scanner.

According to yet another feature in the method of the present invention, the step of assigning further comprises: providing a changeable keys software to the system, and instructing the changeable keys software to assign the at least one symbol.

According to yet another feature in the method of the present invention, the scanning by the at least one scanner includes sensing at least one member of the group consisting of contrast, temperature, color, shape, slant, sound, electromagnetic radiation, volume changes, humidity, static air pressure, size, motion, and Doppler effect.

According to yet another feature in the method of the present invention, the step of instructing is performed manually.

According to yet another feature in the method of the present invention, the step of the providing includes supplying an exchange file, and the step of instructing includes receiving inputs from external sources.

According to yet another feature in the method of the present invention, the step of instructing further includes choosing the at least one symbol selected from the group consisting of color, size, language, function, letters, words, sentences, animation, digital display, video images and voice.

According to yet another feature in the method of the present invention, the external sources include applications software and Internet sites.

According to the present invention, there is provided in an electronic system, a virtual input environment system comprising: at least one scanner for scanning real-space objects, the real-space objects including at least one hand and an input device, the at least one scanner connected to the system, a simulation software for processing information obtained from the at least one scanner, and for generating virtual images of the at least one hand and the input device, a changeable keys software for assigning virtual keys to the virtual image of the input device, a display for displaying the virtual images of the at least one hand and the input device, wherein the at least one hand can be used to input data through the input device into the electronic system.

According to one feature in the virtual input environment of the present invention, the input device includes a keyboard.

According to another feature in the virtual input environment of the present invention, the display is selected from the group consisting of computer monitor, eye-mounted display, television screen, head-up display and eye oriented display.

According to yet another feature in the virtual input environment of the present invention, the virtual image of the keyboard is configurable in a plurality of configurations.

According to yet another feature in the virtual input environment of the present invention, the keyboard includes a blank keyboard.

According to yet another feature in the virtual input environment of the present invention, the keyboard includes a flat substrate.

According to yet another feature in the virtual input environment of the present invention, the keyboard includes a sensing plate.

According to yet another feature in the virtual input environment of the present invention, the sensing plate includes sensing elements chosen from one of the group consisting of pressure, heat, and sound.

According to yet another feature in the virtual input environment of the present invention, the keyboard comprises two parts.

According to yet another feature in the virtual input environment of the present invention, the plurality of configurations includes changeable characters selected from the group consisting of color, size, language, function, letters, words, sentences, animation, digital display, video images and voice.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1B:
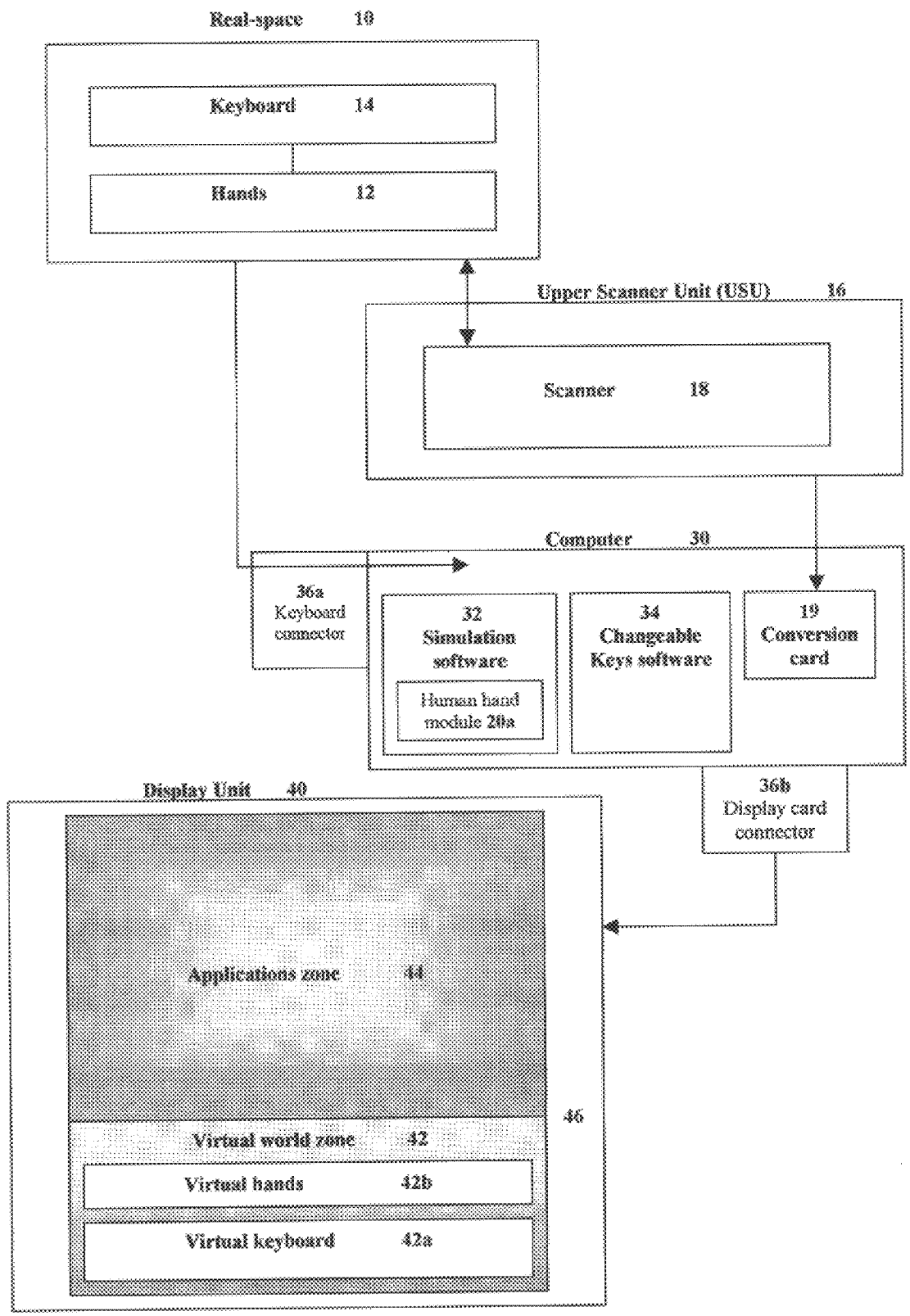
FIG. 1 shows block diagrams of preferred embodiments of system architecture for virtual display according to the present invention.

The operation of input devices such as keyboards in the increasingly sophisticated computing environment can be made simpler and easier by increasing the functionality of each keyboard in such a way that each key presents to the user its present function clearly, preferably with the keyboard represented on the screen in front of his/her eyes. It would be highly advantageous to have a keyboard-on-a-screen or "virtual" animated keyboard which can receive input instructions like a real keyboard and which has changeable keys, in order to answer the increasing number of functions related to each key. In this virtual, selectable, and configurable keyboard, only the current relevant keys should be displayed and each key should display only one symbol at a time, with each symbol representing the specific present function of the key, objectively as well as subjectively to the user's understanding at the same moment. The function should also be changeable according to the presently operated application or Internet site. In addition, it would be highly desirable for an user to be able to see his or her animated hands on the same screen as the keyboard, or in other words to have a virtual representation of both hands and keyboard on the screen. Having a virtual keyboard and virtual hands displayed in the same output area (e.g. a computer screen) would reduce the waste of time and energy the loss of concentration and the typing mistakes caused when a user has to change his or her eye's focus, and to shift his or her field of view from the input device (the keyboard), to the output device (the screen), and vice versa.

The present invention is of a method and system for virtual input environment, and creation of an input unit with changeable keys display. Specifically, the present invention can be used to assign any key or function to a virtual keyboard (which represents a hardware keyboard on which the user performs an input action) displayed on a screen, to simulate and view the hands of a user positioned over the virtual keyboard, and to use the hand to enter data via the virtual keyboard as if it is a real keyboard. A typical sequence of input actions using the method and system of the present invention includes: running a calibration procedure of the user hands and a calibration procedure of the keyboard, done the first time the user uses a particular hardware keyboard and aimed at speeding up the subsequent real-time simulations; operation of a simulation software application for real-time simulation of the hands and keyboard and for their virtual representation on a computer screen; provision of a changeable keys software, and, using it, assignment of chosen symbols to the keys of the virtual keyboard, either manually or by using various sources (such as other applications or Internet sites), the assignment from these sources enabled by an exchange file supplied with the system; and activation of the virtual keyboard with its present key symbols displayed on the screen, by pressing or influencing sensed key positions on the hardware board, while seeing the pressing or influencing action performed by the virtual hands on the screen.

The principles and operation of a method and system for virtual input environment according to the present invention may be better understood with reference to the drawings and the accompanying description.

Figure 1C:
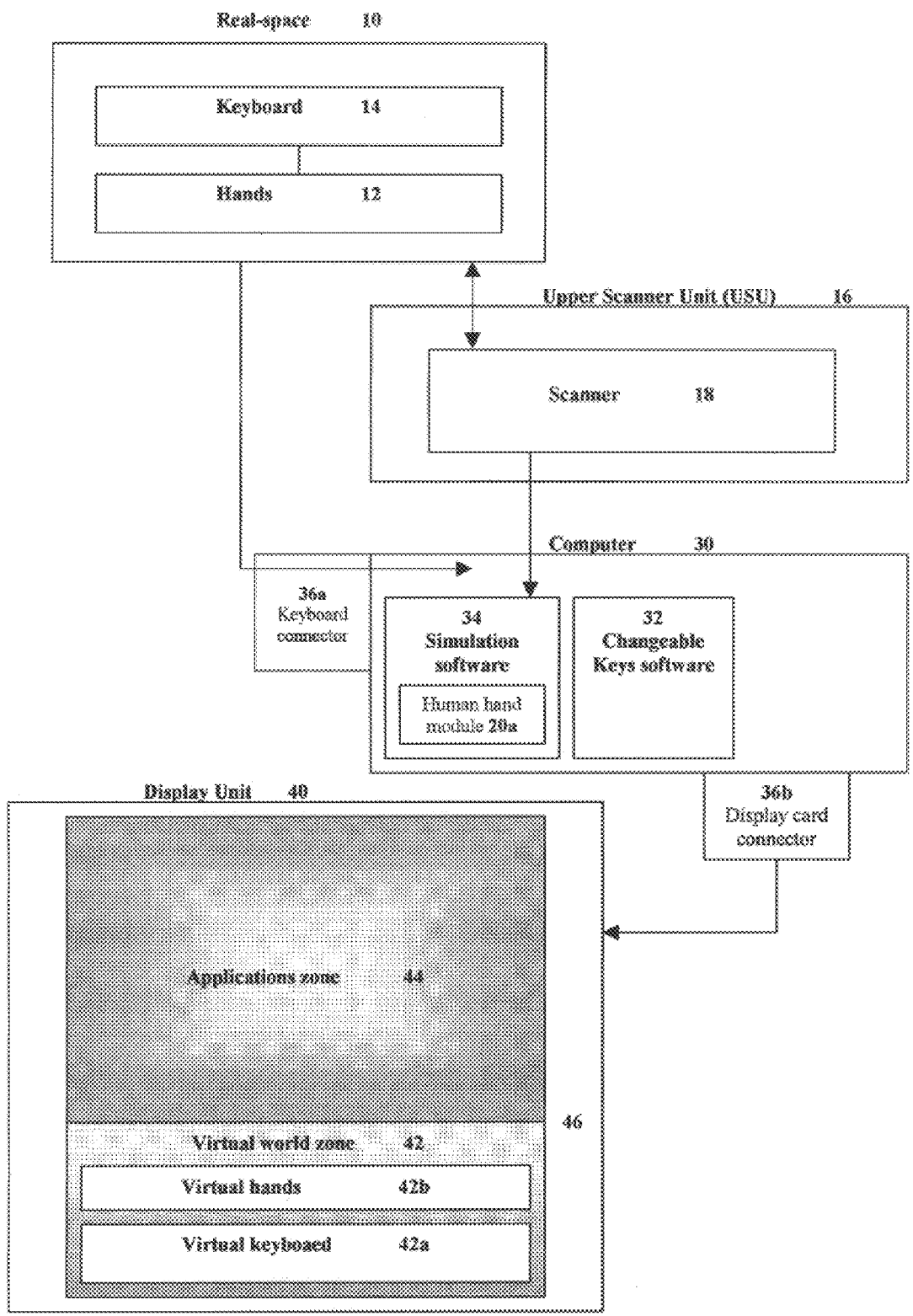

Referring now to the drawings, FIGS. 1a–c show various possible embodiments of the architecture of a system which provides a capability of easy simulation of a real-space 10 into an output device exemplified by a display unit 40. Display unit 40 may be any ordinary or special unit, such as a computer monitor, eye-mounted display, television screen, head-up display such as those used in combat air crafts, an eye oriented display such as the one used in combat pilot helmets, etc. Real-space 10 includes user hands 12, referred to hereafter simply as "hands 12", moving over a real input device 14, which may be a regular keyboard, a touch screen plate, or any other hardware plate capable of generating an input signal resulting from the physical touch of the fingers sensed by the plate, and referred to hereafter as simply "keyboard 14". Preferably, keyboard 14 is an ordinary blank keyboard, manufactured with no drawn letters and symbols on its keys, and which is connected to the system by known wired or wireless connections.

FIG. 1a shows one preferred embodiment of the virtual input system architecture. A scanner unit 16, which includes a scanner 18 and a processor 20, is preferably positioned above real-space 10, most preferably on top of display unit 40, in which case it is referred to as an "upper scanner unit" (USU). However, scanner unit 16 can be located in any other position which enables it to "view", scan and sense real-space 10 in its entirety. More than one scanner unit 16 can be used for the purposes of the present invention, positioned anywhere in real-space 10, i.e. at different angles and ranges relative to keyboard 14 and hands 12 where it can sense both. Scanner 18 senses the exact characteristics and position of both keyboard 14 and hands 12 relative to other objects in real-space 10, and delivers this sensing or scanning information, which may include contrast, temperature, color, shape, slant, sound, electromagnetic radiation, volume changes, humidity, static air pressure, known images recognition, size, motion, Doppler effect, etc., to processor 20, which converts the information to a digital output. A simulation software 32, located in a computer 30, receives the converted digital data from processor 20. In the embodiment shown in FIG. 1b, scanner 18 is connected to a conversion card 19 located in computer 30, and simulation software 32 receives the converted digital data from conversion card 19. In another embodiment shown in FIG. 1c, scanner 18 is directly connected to simulation software 32 in computer 30, the direct connection made possible if the output of scanner 18 is a known communication protocol (e.g. USB protocol).

In the embodiments shown in FIGS. 1a and 1b, the digital output of scanner 18 serves as input to processor 20 or conversion card 19. Processor 20 or card 19 convert the digital signal to a communication protocol known to simulation software 32, which receives the signal from processor 20 or card 19, and which contains a great number of fixed algorithms in a human hand natural behavior module 20a, hereafter referred to as "human hand module 20a". Exemplary algorithms of human hand module 20a are average hand and finger shape, the range of the velocity of the human typing action, Infra Red radiation, movement, Doppler input, or visible light reflection of the human hands, tapping sounds, etc. In another embodiment, human hand module 20a may be included as a software program in the memory of processor 20. Simulation software 32 uses the converted data output of scanner unit 16, in order to determine the position of keyboard 14 relative to scanner unit 16, the position of hands 12 relative to scanner unit 16, and the position of hands 12 relative to keyboard 14. The converted data output of scanner unit 16 enables simulation software 32 to simulate a virtual image of real objects from real-space 10, for example a virtual input device or "virtual keyboard" 42a, and a virtual hands 42b, in a virtual world zone 42, which occupies a part of a screen 46 of display unit 40. Virtual zone 42 typically shares screen 46 with an applications zone 44. One thus obtains a real-time simulation or a real-time "animation" (not a video image) of the objects in real-space 10 on screen 46. Virtual images 42a and 42b are therefore formed in a sequence of steps which include scanning real objects in real space, transmitting the scanned information to the electronic system, using a simulation software to simulate the virtual images, and using virtual reality techniques to position and move the virtual objects on screen 46. Input signals from input device 14 are received by computer 30 through a wired connection including for example, a keyboard connector 36a, or by a wireless connection. Computer 30 is typically further connected to display unit 40 through a wired connection including a display card connector 36b. FIGS. 1a–c also show a changeable keys software 34 incorporated in computer 30. Keys software 34 facilitates changing of virtual keys on virtual keyboard 42a, as described in detail later in this specification.

Figure 2A:
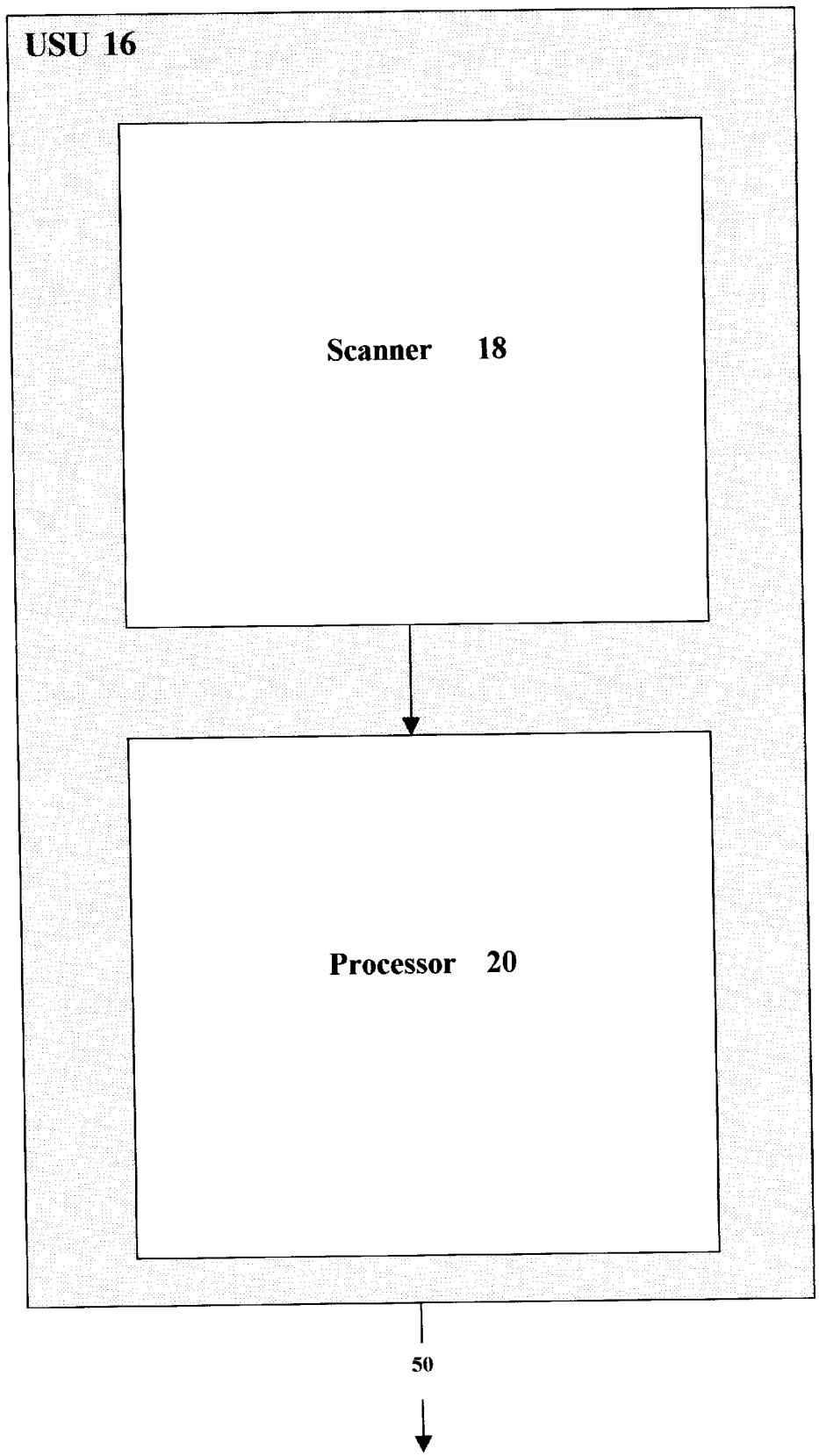
FIG. 2 shows flowcharts of exemplary embodiments of a process for defining the position and movements of the real input device and of the user's hands.
Figure 2B:
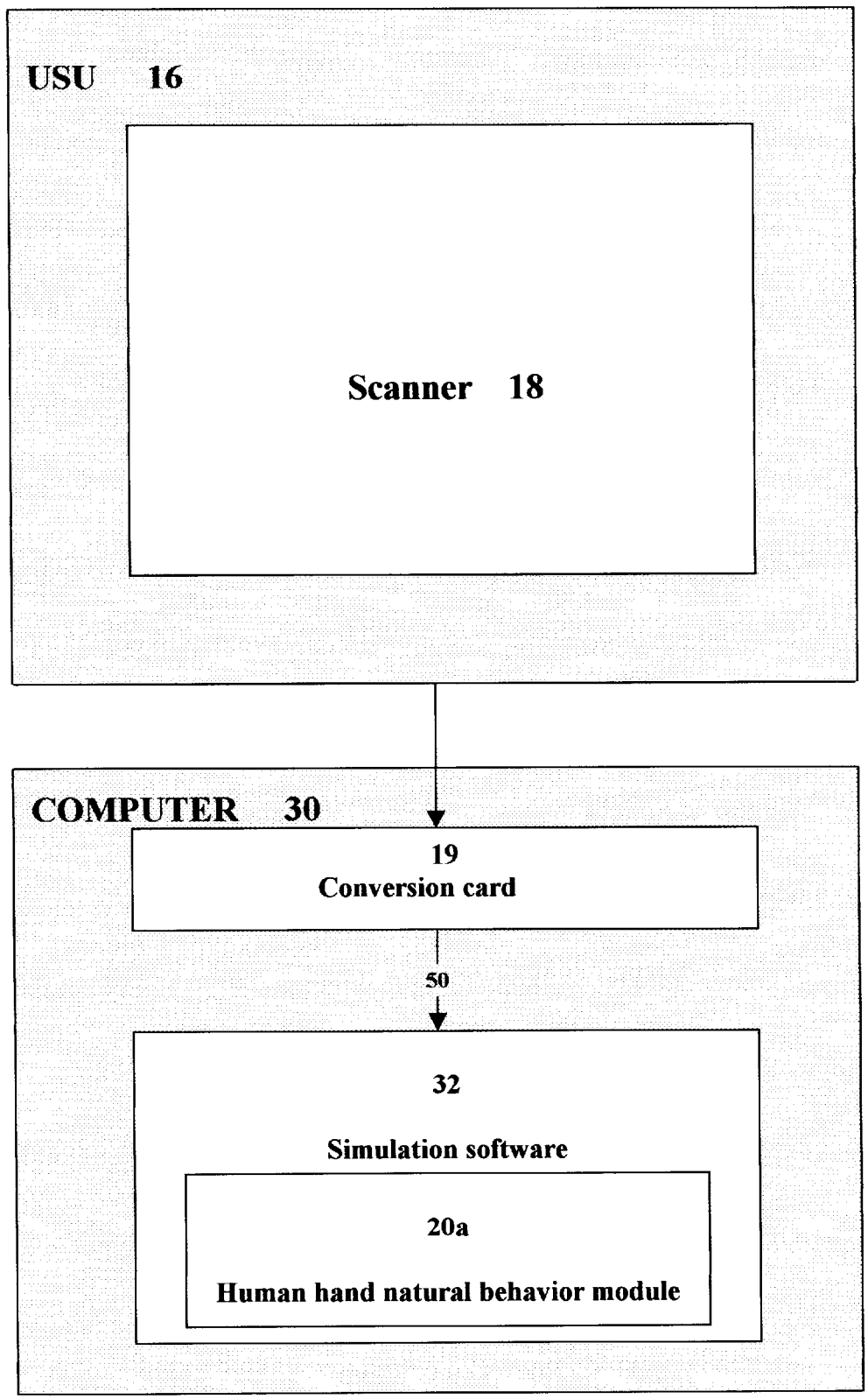
Figure 2C:
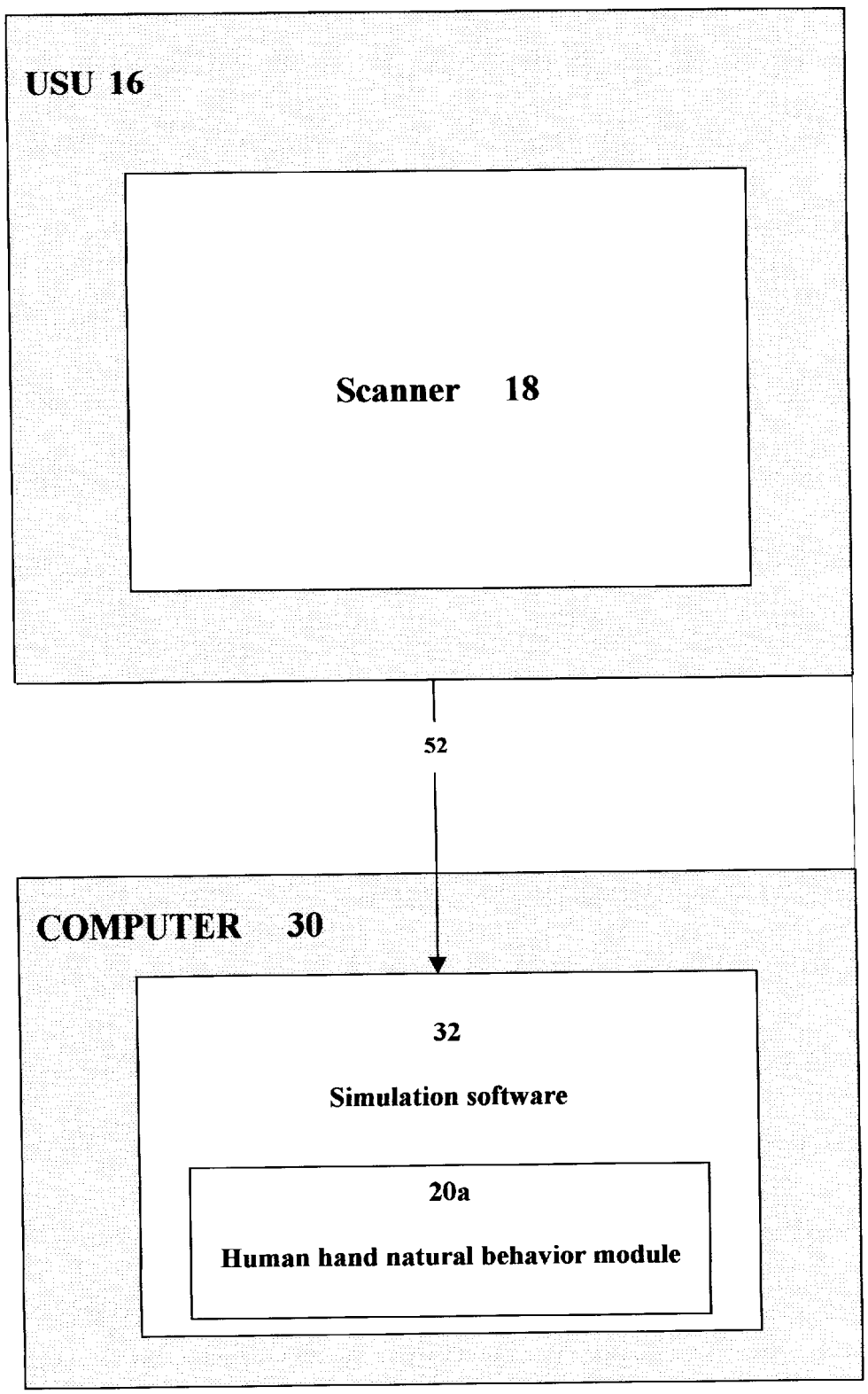

FIG. 2 describes the steps used by scanner 18, processor 20, and simulation software 32, to continuously determine the exact position and movements of hands 12 and of input device 14. A sequence of steps matching embodiments (a), (b) and (c) in FIG. 1 are shown respectively in (a), (b) and (c) of FIG. 2. In the embodiments shown in FIGS. 2a and 2b simulation software 32 uses converted digital display orders 50, received from processor 20 or conversion card 19, to constantly generate both virtual keyboard 42a and virtual hands 42b in virtual world zone 42. In the embodiment shown in FIG. 2c, simulation software 32 uses a known communication protocol data 52, received directly from scanner 18, to create virtual keyboard 42a and user virtual hands 42b (also referred to as virtual objects 42a and 42b) in virtual world zone 42. Simulation software 32, typically using fixed algorithms and changeable criteria, manipulates the converted digital display orders 50 or protocol data 52 to create animated, dynamic, "natural", and quickly understood dynamic images of virtual objects 42a and 42b. Virtual objects 42a and 42b may be positioned, shaped and centered in any desired location, shape or throw in virtual world zone 42, regardless of the relative position and X, Y and Z axis movements of hands 12 and keyboard 14 in real-space 10, as sensed by scanner unit 16. Simulation software 32 also defines the shape, color, contrast and animated image appearance of virtual objects 42a and 42b. The size and positioning of virtual world zone 42 on screen 46 is at the discretion of the user. For example, zone 42 may occupy the lower section of screen 46, in proximity to applications zone 44, or it may be floating over applications zone 44 (e.g. as another window application). Simulation software 32 may also redefine the boundaries of applications zone 44 while insuring it retains all its information, in order to make space for virtual world zone 42.

Once virtual objects 42a and 42b are displayed in virtual world zone 42, the user no longer needs to shift his eyes to real-space 10, in order to select a desired key to be pressed, since he or she sees the keyboard, as well as their hands on screen 46. Furthermore, it may no longer be necessary for keyboard 14 to contain any drawn symbols, since virtual keys and other symbols may be superimposed on virtual keyboard 42a, as described below. Keyboard 14 can then be, for example, a blank board that can be used, according to additional features of the present invention described below, as an international and multilingual hardware keyboard. Changeable keys software 34 now enables the user to assign (define) any symbol on any key of virtual keyboard 42a, either through direct instructions (definitions originating from the user) or through the use of software instructions or programs originating from various sources, including software vendors and Internet sites. For example, the user may want the "Shift" key to be brighter than all other keys, and may give the relevant instruction to software 34 to exhibit this input on keyboard 42a. In another example, the "Enter" key may be assigned the "Find" function when using a browser such as Netscape, the assignment being implemented automatically when Netscape is used. In yet another example, an Internet site may assign its own "keys" to the virtual keyboard every time that site is accessed by the user. The instructions of key assignments originating from external vendors or Internet sites and directed to changeable key software 34 are done preferably through an exchange file provided with the system. The translation of these instructions is performed in a keys display auto load module 34d and a keys display setups library 34c of changeable keys software 34, according to the specific exchange file data received from other applications.

The assignment of virtual keys to keyboard 42a is typically done after completion of calibration procedures for keyboard 14 and hands 12, described in detail below, after the formation of the animated images of virtual keyboard 42a and hands 42b, and once fast real-time input is enabled by constant real-time processing of the movement and relative position of hands 12 over keyboard 14. In general, the keys of virtual keyboard 42a can be assigned changeable characters selected from one of the group of colour, size, language, function, letters, words, sentences, animation, digital display, video images and voice.

Figure 3:
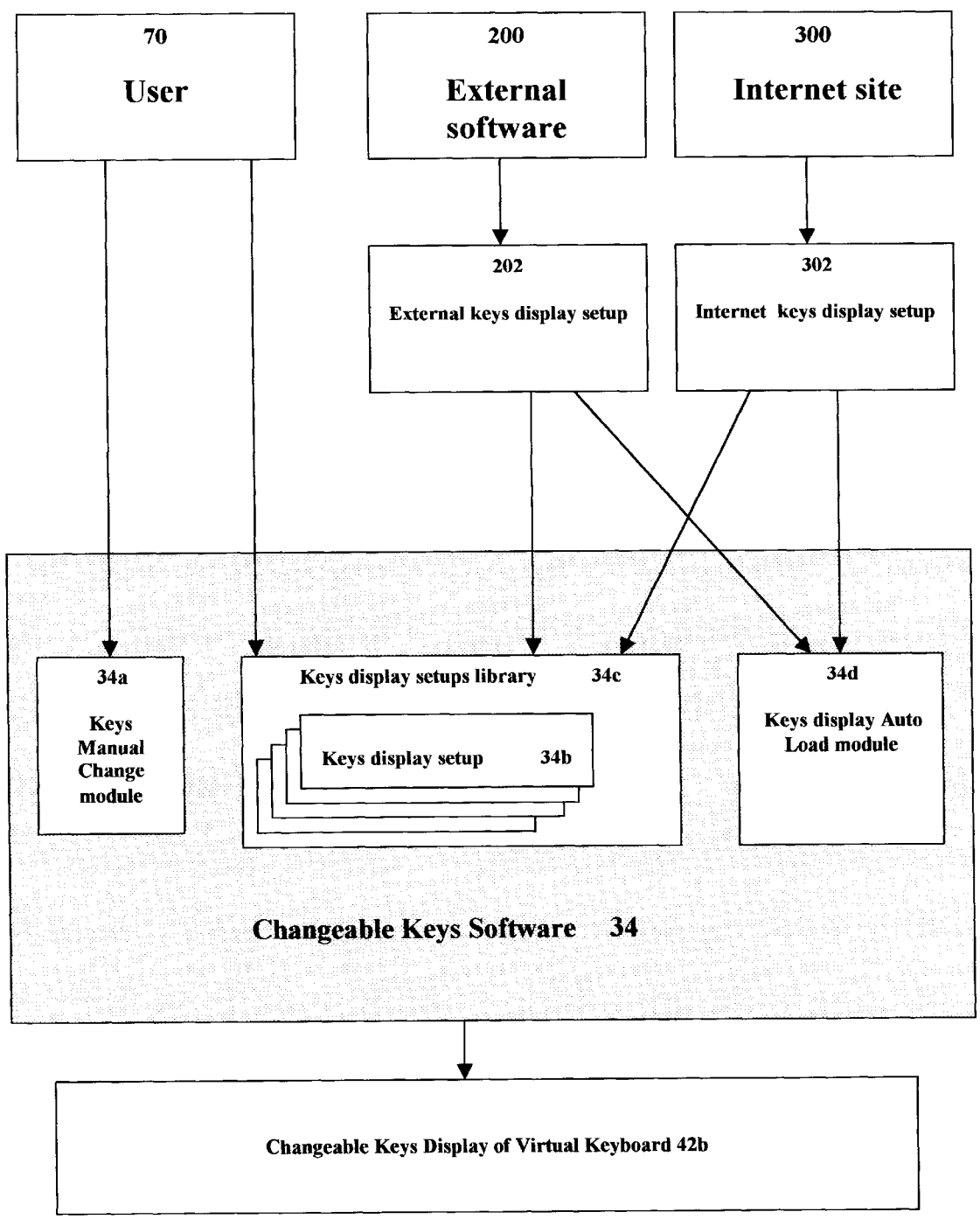
FIG. 3 is a block diagram of exemplary optional uses of the changeable keys software to change the keys display in the virtual keyboard.

FIG. 3 describes typical operation options of changeable keys software 34. There are at least three major options by which the key display on virtual keyboard 42a (referred to as "virtual key display") may be changed.

In a first major option, a user 70 manually changes each key of the virtual key display (herein "virtual key") by using a keys manual change module 34a of software 34. In this option, user 70 chooses a specific virtual key and decides which shape, color, symbol, animation, picture, video movie, 3D, sound or any other display option will be assigned to that key. User 70 can choose a permanent display option or reaction, or a specific display or reaction related to a specific computer software/operation system mode/sub mode function. User 70 can also select a virtual key display setup 34b, which is saved by software 34 in key display setups library 34c. Many permanent setups may serve as setup 34b. One such permanent setup is for example "Language changing when pressing the ALT+SHIFT keys". Another such setup is "Showing one symbol at a time using the SHIFT key". Another such setup is "Only capital letters when CAPS LOCK is pressed". Additional setups may be "Big symbols", "Yellow symbols" etc. User 70 can choose as many setups 34b as he or she wish to work with simultaneously. User 70 can also change each setup according to his or her will, or add his or her own setups to library 34c. Finally, user 70 can save his or her preferred list of active setups under a specific profile name, to be used in the future.

A second major option of changing the virtual key display using changeable keys software 34, is to have software 34 enable an external software 200 (such as Microsoft application software) to define the virtual key display. External software 200 can be any software which has its own external key display setup 202, including games, word processors, electronic charts, database management software, or professional software, which needs a keyboard to input data, and which has the capability to connect to the system, and to influence changeable keys software 34 through the exchange file. External software 200 may then add its setup 202 to display setup library 34c. In one example, a flight simulator game software may have a setup 202 in which the "Gun" word or the "Gun" figure are displayed over the ordinary "Space" key, and a "Landing Gear" figure instead of the "G" key, while all the unneeded keys for the specific game are invisible in virtual world zone 42. Another example is a display setup 202, in which the word "Do" is replacing the word "Enter" on the keyboard, and the word "Help" replaces the "F1" symbol of the ordinary keyboard. Such setups make the operation options of each ordinary keyboard 14 easy, understandable and unlimited.

In a third major option shown in FIG. 3, keys software 34 enables an Internet site 300, which has the capability, the software 34 exchange file, and the capability and permission to influence keys software 34, to supply a keys display setup 302. In this case, the current function of each key of keyboard 14 and the display drawn over each virtual key in virtual keyboard 42a come from an Internet site. For example, at present, an Internet "Casino" site usually uses keys known as "INSERT", "HOME", PAGE UP", DELETE", "END" and "PAGEDOWN" to select the amount of money in a current bet, so if the user presses "INSERT" he raises the bet by, for example, 50$. Using the present invention, the casino site may instruct virtual keyboard 42a to display the "50$", "100$" mnemonics over the relevant virtual keys, thus allowing the user to press directly the "50$" key instead of "INSERT", etc.

Figure 4:
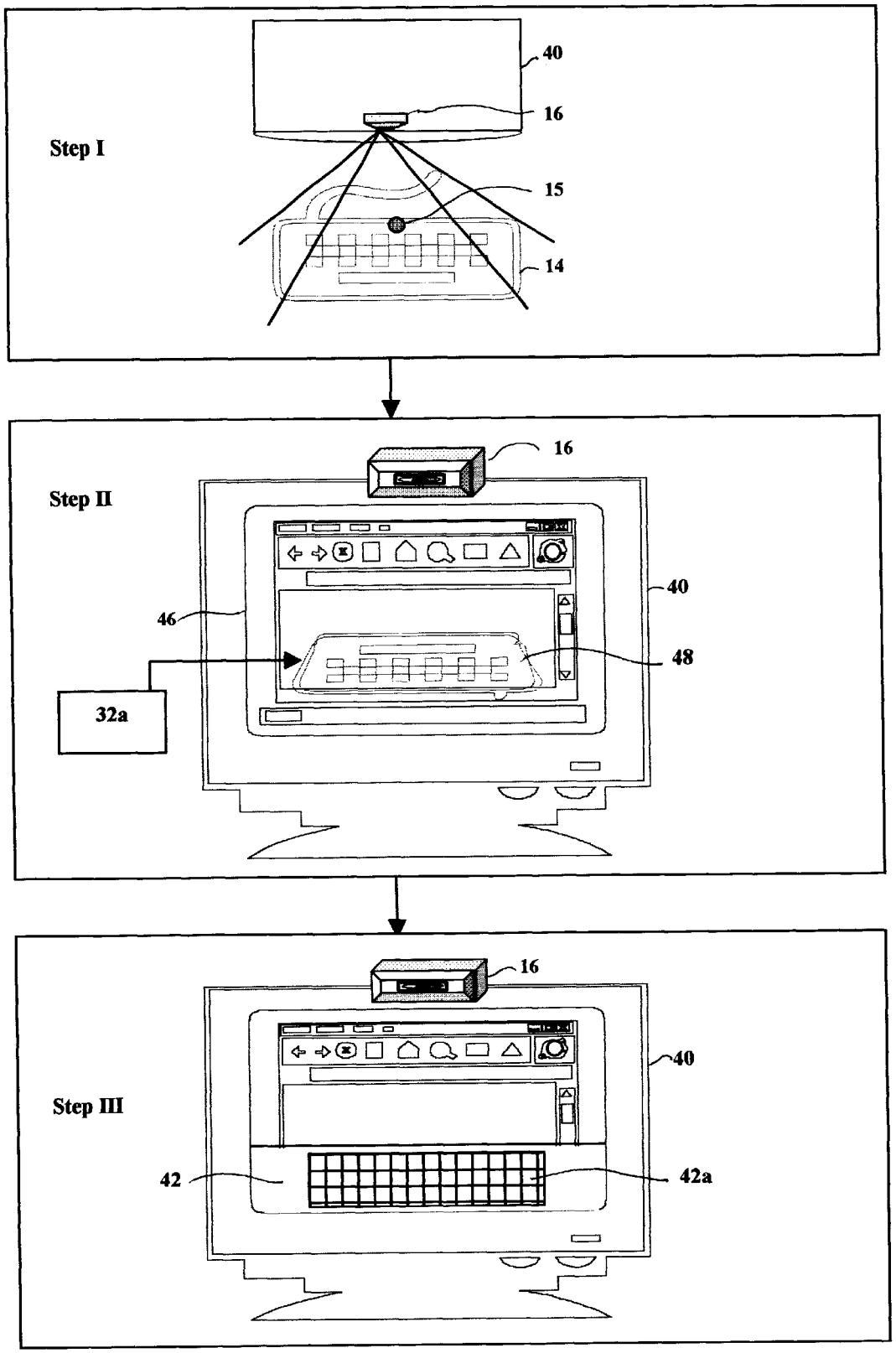
FIG. 4 is a perspective view of an exemplary keyboard calibration procedure, in which the scanner unit identifies the real input device special characters in order to create a real-time simulated image of the input device, and to place the simulated image on the virtual display.

FIG. 4 illustrates typical steps of a first iteration in a "keyboard calibration procedure" which transforms a real-space image into a simulated or animated image. This process is typically done only once, the first time the user uses the particular hardware keyboard. In step I, keyboard 14 is positioned anywhere in the space viewed by scanner unit 16. Scanner unit 16 senses specific characters of keyboard 14, such as size, shape, color, contrast, Infra Red radiation, Doppler input, number of pixels, electromagnetic radiation, tapping sound, vibration, special reflecting objects such as a sticker 15 attached to keyboard 14, etc. In a preferred embodiment, scanner unit 16 includes a digital video camera for imaging keyboard 14 in the calibration procedure. In step II, simulation software 32 displays a video image 48 of keyboard 14 on display unit 40. A Man Machine Interface (MMI) feature 32a of simulation software 32 now operates calibration features, "asking" the user to determine (using a mouse or any other input device) the boundaries of video image 48 on display unit 40. The interactive calibration procedure may include "questions" that the user is asked by simulation software 32 and his or her "answers" which allow software 32 to recognize the specific characters of keyboard 14. This first recognition of the specific keyboard by simulation software 32 speeds up the later real-time simulation. Among other actions, the user may be asked by simulation software 32 to point at the four corners of keyboard video image 48, to type, and to point for example with a mouse cursor at several keys on image 48 in response to queries from simulation software 32. In step III simulation software 32 calculates the converted output of scanner unit 16, of the user and of simulation software MMI 32a, and displays virtual keyboard 42a on screen 46, replacing video image 48. Virtual keyboard 42a is no longer a video image, but a simulated digital pixel image, containing all the specific characteristics of keyboard 14. At this stage, virtual keyboard 42a exhibits the look of keyboard 14, typically a standard keyboard with standard keys. If keyboard 14 is blank or is a plate, virtual keyboard 42a exhibits the look of a "default" keyboard, with keys and displays defined as default (according to the language choice of the user), using a default setup determined by changeable keys software 34.

Figure 5:
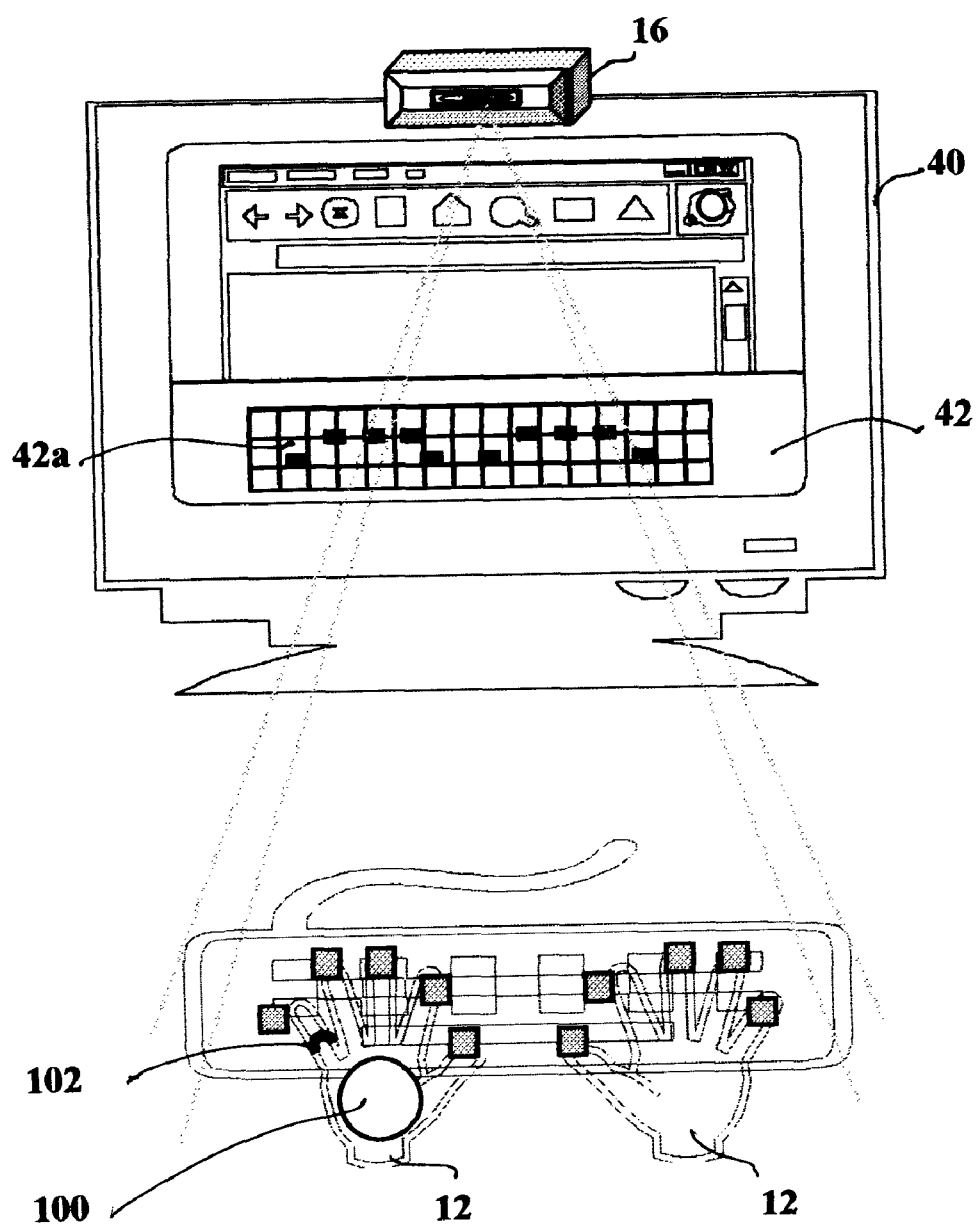
FIG. 5 is a perspective view of an exemplary hands calibration procedure.

FIG. 5 illustrates typical steps of a first iteration in an iterative "hands position calibration procedure" involving two hands. The inputting of data according to the present invention may use two hands, only one hand, or any number of individual fingers, however the calibration described herein is preferably done with both hands. The main goal of this procedure, as with the keyboard calibration, is to make the real-time simulation of virtual hands 42b, and the action of virtual hands 42b inputting data through virtual keyboard 42a, faster. Simulation software 32 already displays virtual keyboard 42a on screen 46. The hands position calibration is also an interactive process, similar to the calibration procedure of real keyboard 14 illustrated in FIG. 4 and described above. Once simulation software 32 has calibrated the specific characters of keyboard 14 and has positioned its virtual image 42a in virtual world zone 42, it is ready to calibrate the specific characters of hands 12. Simulation software 32, using virtual keyboard 42a, "asks" the user to put his or her fingertips above specific keys of real keyboard 14. Then, the user is asked to push one key at a time, so that simulation software 32, knowing the exact position of each of hands 12 provided by the pressing action on specific keys of real keyboard 14, can save the data characteristics of hands 12. As a result, simulation software 32 is able to identify characteristic features specific to each finger of a particular user. Characteristic features will be for example specific color, shape, radiation, Doppler input, tapping sound, etc. The hands position calibration procedure therefore uses keyboard 14 to locate, during key pressing, the exact position of each hand of hands 12, and in each hand the exact position of each finger. Knowing the exact position, simulation software 32 "remembers" the exact scanner unit 16 inputs in each static position, and simulation software 32 adds the specific user data to a specific user file. Simulation software 32 remembers the characteristics of each particular user, so that each time when that particular user operates the system (and identifies himself or herself) the real-time simulation may use the specific hands characteristics in order to make the determination of user's real position and movements relative to scanner unit 16 and to real keyboard 14, faster. As mentioned above, human hand natural behavior module 20a which is incorporated in simulation software 32 contains algorithms, such as the average hand and finger shape, tapping sound, the range of the velocity of the human typing action, the infra red radiation, the visible light reflection of the human hands, the time, season and geographic location influences of any of the above, etc. The data received in the first hands calibration procedure is analyzed by module 20a to determine in which parameters the particular user is average, and in which values his or her hands are different from average parameters—again to make the later real-time simulation faster. Once the calibration procedure ends, the user may save his or her hands currently recognized characters in simulation software 32, so that they will not have to be calibrated again in the future in order to use the system. Normally, the interactive calibration procedure includes several steps, such as positioning of the hands over different positions of keyboard 14 and at different heights above keyboard 14, fingers spreading and bending, double finger keys pressing, hands crossing etc. Of major importance in the hands position calibration is a palm major mass area 100. Once the processor identifies the specific characters of mass area 100, the rest of the calibration procedure gets easier. Importance is also given to any unique object on hands 12 such as jewelry, for example a ring 102, that helps simulation software 32 identify the specific characters of the hands. Another such unique object may be a special sticker similar to sticker 15 described in FIG. 4, which may be worn on the top side of each hand (in major mass area 100), and which can be viewed by scanner 18. The sticker should have a high contrast and a specific geometric shape, so that the conversion of the digital signal representing the sticker to the software is faster (each geometric throw has an immediate meaning of the hand position). The round symbol 100 in FIGS. 5 and 6 which represents the palm's major mass area may also represent such a special reflecting sticker.

Figure 6:
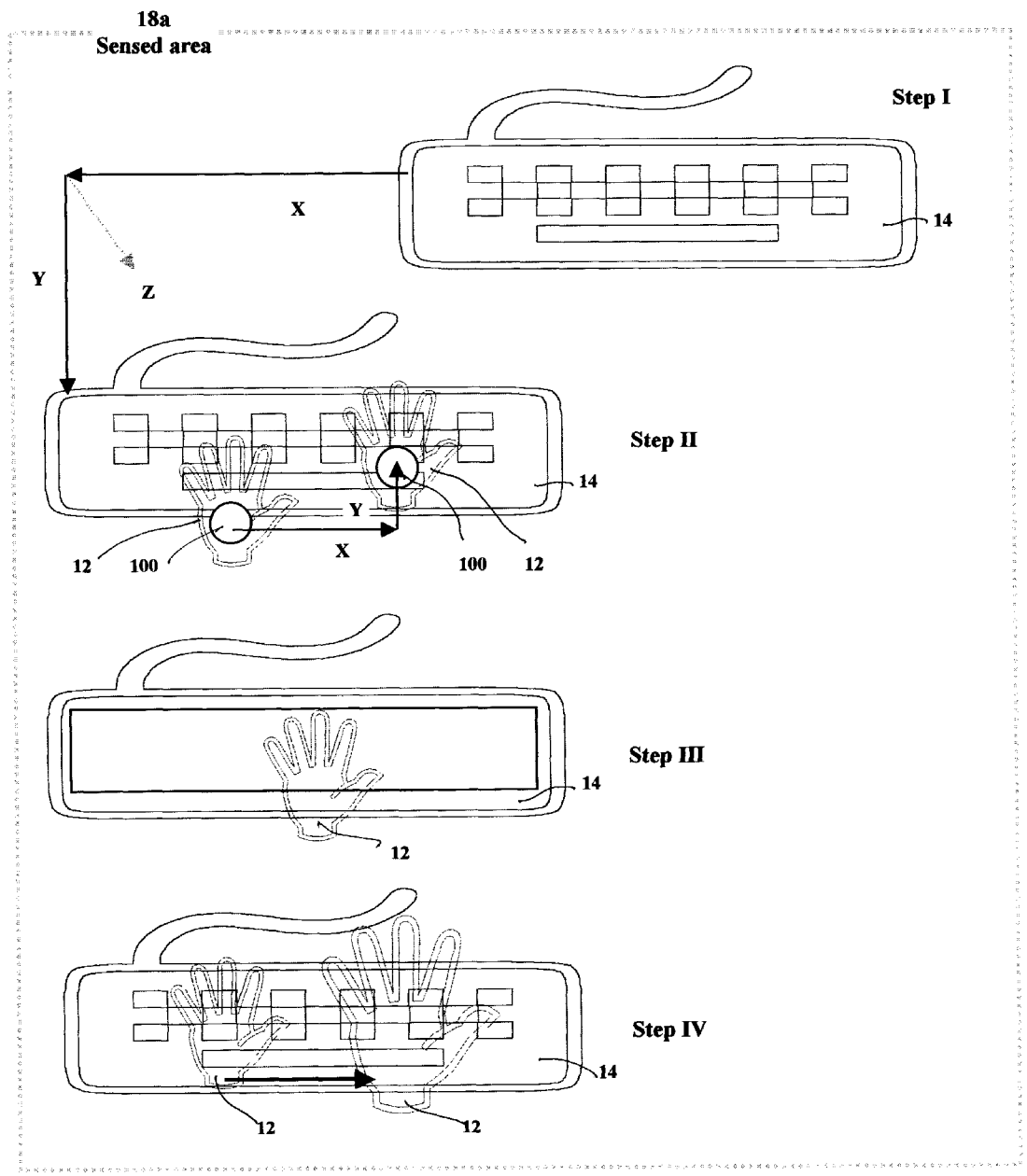
FIG. 6 is a perspective view of some exemplary steps used by the scanner unit and the simulation software to identify the current position and movements of the input device and of the user's hands over it.

FIG. 6 describes exemplary steps that simulation software 32 takes in order to identify the positions of keyboard 14 and hands 12, sensed in an area 18a by scanner 18, during the real-time simulation and after the calibration procedures are completed. In steps I and II, the movement of keyboard 14 in axes X and Y is sensed. Keyboard 14 movement in axis Z is also sensed, however it is usually a rare movement. Another possibility is that the user defines a known position as the "zero" position of keyboard 14, so that the following movements of keyboard 14 will be relative to that position. In this implementation the exact position of keyboard 14 is calculated in relative values using movement scanners (not shown) on the bottom of keyboard 14 (e.g. the relative position technology commonly used to define the relative position of a computer mouse). In step II, the movement of hands 12 in the X-Y plane is sensed, especially that of major mass area 100. In step III simulation software 32 uses the known (from the calibration) characteristics of hands 12 and keyboard 14, such as different contrasts, in order to determine the exact position and movements of each of the user fingers in real-space 10. In step IV, size changes in hands 12 or its fingers are sensed, so that simulation software 32 is able to determine the exact height of hands 12 above keyboard 14 in the Z direction. In this real-time simulation procedure of constantly changing hands positions, each key pressing by the user helps simulation software 32 to make the last and totally correct hand position indication.

Figure 7:
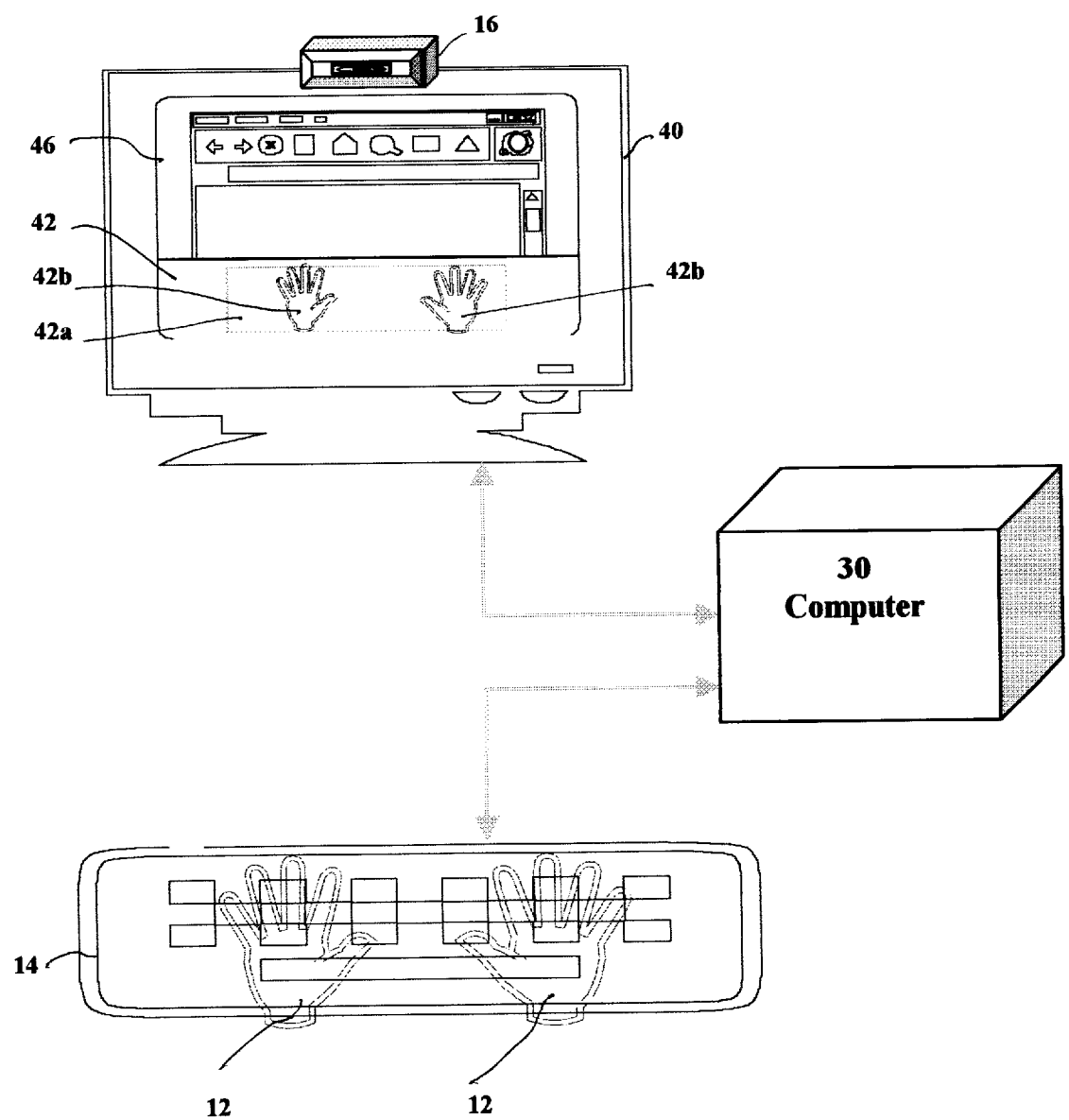
FIG. 7 is a perspective view of the combined virtual display of the input environment with both the input device and the user's hands in the output device.

Once the calibration procedures (described in FIGS. 4 and 5) are completed (one time for each user and for each keyboard type), the final dynamic display resulting from the converted digital output of scanner unit 16, processed by simulation software 32, and displayed in virtual zone 42 of screen 46 is shown in FIG. 7. Virtual keyboard 42a appears on screen 46 with virtual hands 42b "floating" above it. From that point on, each movement of keyboard 14 and of any of the hands 12 over keyboard 14 in real-space 10 is immediately displayed in virtual display zone 42 (in a real-time process). Keyboard 14 no longer needs to have any symbol over each key, and in fact, as mentioned above, may be blank. The perfect simulation of the position and movements of keyboard 14 and of hands 12 in virtual world 42 allows the user to use the changeable keys feature, supported by the changeable keys software 34. The user then can do all of his or her data inputting using virtual keyboard 42a, without looking at keyboard 14 or hands 12.

The inputting (e.g. typing) action may now be carried out in one of three preferred options, while user 70 sees the function of each key and the position of his or her fingers on virtual keyboard 42a: in the first, user 70 physically inputs the data by pressing on keys on real keyboard 14. As mentioned above, keyboard 14 may in fact not be a keyboard at all, but a sensing blank plate or board with sensing elements for pressure, heat, sound, etc in places defined as "keys", and assigned key functions. This board may be divided into two parts (one for each hand) and the user may for example position the right part on the right side of display unit 40 and the left part on the left side of display unit 40, to clear the area between user and display unit 40 for other uses. Still, virtual object 42a and 42b will be displayed in a natural combined way on screen 46. In the second option, sound sensors may be used to recognize the taps of the fingers (in the typing action) in order to know that user 70 pressed a key, in which case one needs not a real keyboard below the real fingers, but a sensing "sound recognition board or plate" which is capable of determining (using sounds recognition abilities) the action of finger pressing. The function of this sound recognition board is to deliver an input signal to the system which indicates that a finger has tapped the board, regardless of the relative position of hands 12 over the board or plate. Since virtual keyboard 42a is displayed on screen 46 and virtual hands 42b are "floating" above it, the only signal needed by simulation software 32 is the actual tapping signal, received from the board, in order to determine that the virtual key displayed on screen 46 was pressed. In the third option "time filters" are used: if a virtual finger of virtual hand 42b is positioned over a virtual key of virtual keyboard 42a for a long enough period of time, this is considered a key-pressing action, and in this case neither a real keyboard nor a sound board are needed.

While the invention has been described with respect to a limited number of embodiments, it will be appreciated that many variations, modifications and other applications of the invention may be made.

What is claimed is:

1. A method for inputting data into an electronic system, comprising the steps of:
   (a) providing a physical keyboard connected to the electronic system;
   (b) sensing a calibration image of said physical keyboard, and recognizing, at least in part from said calibration image, said physical keyboard as one of a plurality of keyboard types;
   (c) generating a simulated image of said physical keyboard on a display of the electronic system, said simulated image functioning as a virtual keyboard;
   (d) assigning at least one symbol to at least one key of said virtual keyboard;
   (e) sensing real-time images of at least one hand of a user and processing said real-time images to generate a dynamic display including simulated images of at least one hand in spatial relationship to said virtual keyboard, said simulated images functioning coordinately with the hand of the user such that said simulated images function as a virtual hand of the user; and
   (f) inputting data via said physical keyboard with the at least one hand.

2. The method of claim 1, wherein said step of inputting further includes positioning said at least one virtual hand over said virtual keyboard, and influencing said at least one key to generate an input signal into the system.

3. The method of claim 1, wherein said steps of simulating further comprise running a calibration procedure for said at least one virtual hand and said virtual keyboard.

4. The method of claim 1, wherein said steps of sensing a calibration image and sensing real-time images are performed by at least one video camera.

5. The method of claim 1, wherein said step of assigning further comprises:
 (i) providing a changeable keys software to said system; and
 (ii) instructing said changeable keys software to assign said at least one symbol.

6. The method of claim 5, wherein said step of instructing is performed manually.

7. The method of claim 5, wherein step of said providing includes supplying an exchange file, and said step of instructing includes receiving inputs from external sources.

8. The method of claim 5, wherein said step of instructing further includes choosing said at least one symbol selected from the group consisting of color, size, language, function, letters, words, sentences, animation, digital display, video images and voice.

9. The method of claim 7, wherein said external sources include applications software and Internet sites.

10. In an electronic system, a virtual input environment system comprising:
 (i) at least one imaging device for obtaining real-time images of real-space objects, said real-space objects including at least one hand and a keyboard, said at least one imaging device and said keyboard connected to said system;
 (ii) a simulation software for processing said images obtained from said at least one imaging device so as to:
  (a) recognize, at least in part from at least one of said images, said keyboard as one of a plurality of types of keyboard and to generate a simulated image of said keyboard, said simulated image functioning as a virtual keyboard; and
  (b) to generate from said images a dynamic display including simulated images of said at least one hand in spatial relationship to said virtual keyboard;
 (iii) a changeable keys software for assigning virtual keys to said virtual keyboard;
 (iv) a display for displaying said simulated images of said at least one hand and said keyboard; wherein
 said at least one hand can be used to input data through said keyboard into said electronic system.

11. The virtual input environment of claim 10, wherein said display is selected from the group consisting of computer monitor, eye-mounted display, television screen, head-up display and eye oriented display.

12. The virtual input environment system of claim 10, wherein said simulated image of said keyboard is configurable in a plurality of configurations.

13. The virtual input environment system of claim 10, wherein said keyboard includes a blank keyboard.

14. The virtual input environment system of claim 10, wherein said keyboard includes a flat substrate.

15. The virtual input environment system of claim 10, wherein said keyboard includes a sensing plate.

16. The virtual input environment of claim 15, wherein said sensing plate includes sensing elements chosen from one of the group consisting of pressure, heat, and sound.

17. The virtual input environment of claim 10, wherein said keyboard comprises two parts.

18. The virtual input environment system of claim 12, wherein said plurality of configurations includes changeable characters selected from the group consisting of color, size, language, function, letters, words, sentences, animation, digital display, video images and voice.

* * * * *